(12) United States Patent  
Schwerk (10) Patent No.: US 8,335,802 B2  
(45) Date of Patent: Dec. 18, 2012

(54) DISTRIBUTING REPOSITORY INFORMATION

(75) Inventor: Uwe Schwerk, Heidelberg (DE)

(73) Assignee: SAP AG, Walldorf (DE)

( * ) Notice: Subject to any disclaimer, the term of this patent is extended or adjusted under 35 U.S.C. 154(b) by 692 days.

(21) Appl. No.: 10/973,027

(22) Filed: Oct. 25, 2004

(65) Prior Publication Data

US 2006/0100994 A1    May 11, 2006

(51) Int. Cl.
G06F 7/00 (2006.01)
(52) U.S. Cl. .......................................... 707/796
(58) Field of Classification Search ............... 707/10, 707/796
See application file for complete search history.

(56) References Cited

U.S. PATENT DOCUMENTS

| | | | |
|---|---|---|---|
| 6,567,796 B1 | 5/2003 | Yost et al. | 707/2 |
| 2002/0073080 A1* | 6/2002 | Lipkin | 707/3 |

OTHER PUBLICATIONS

"Reporting Agent", downloaded from http://help.sap.com/saphelp_nw04 on Sep. 28, 2004, 2 pages.

* cited by examiner

*Primary Examiner* — Apu Mofiz
*Assistant Examiner* — Ajith Jacob
(74) *Attorney, Agent, or Firm* — Mintz Levin Cohn Ferris Glovsky and Popeo, P.C.

(57) ABSTRACT

A computer-implemented method of distributing information retrieved from one or more data repositories includes: invoking a producer method to generate a document using data retrieved from one or more data repositories; invoking a converter method to convert the generated document to an output format; and invoking a distributor method to distribute the converted document through a distribution channel. The methods may be implemented in a framework that allows flexible implementation of one or more additional methods. The methods may belong to respective producer, converter and distributor classes.

32 Claims, 5 Drawing Sheets

DISTRIBUTING REPOSITORY INFORMATION

TECHNICAL FIELD

This description relates to distributing information retrieved from one or more data repositories.

BACKGROUND

Some computer systems wherein large amounts of data are processed are provided with a data warehouse system for housing data. The data warehouse allows the data to be processed and manipulated in various ways. Typically, users can retrieve data from the data warehouse system, for example by formulating queries to be performed on the warehouse data. The data can be displayed to the user in formatted shape, for example in a graphical user interface (GUI). The querying feature allows the user to identify, and access, data in the data warehouse that the user is interested in.

More sophisticated solutions may have predefined queries that can be automatically performed. One example is the Reporting Agent feature that is available in data warehousing products from SAP AG in Walldorf (Baden), Germany. The Reporting Agent can run queries to pre-calculate web templates or other reporting objects in the SAP system. The precalculated reporting objects can then be distributed to one or more addressees. Such systems are intended to eliminate the need for the user to search for relevant information by regularly querying the data warehouse and distributing the results.

SUMMARY

The invention relates to distributing repository information.

In a first general aspect, a method of distributing information retrieved from one or more data repositories comprises invoking a producer method to generate a document using data retrieved from one or more data repositories. A converter method is invoked to convert the generated document to an output format. A distributor method is invoked to distribute the converted document through a distribution channel.

In selected embodiments, the producer, converter and distributor methods are invoked by processing a setting that references the producer, converter and distributor methods. The setting may be processed in a framework that provides runtime and designtime environments for the setting.

In selected embodiments, the producer, converter and distributor methods are invoked by one selected from the group consisting of: a schedule, a user input, an event, and combinations thereof.

In a second general aspect, a software framework for distributing information retrieved from one or more data repositories comprises a producer method for generating a document using data retrieved from one or more data repositories, a converter method for converting the generated document to an output format, and a distributor method for distributing the converted document through a distribution channel.

Advantages of the system and techniques described herein may include any or all of the following. Providing improved distribution of data repository information; providing a more flexible information distribution; providing a framework configured such that the information distribution can be easily enhanced over time; and providing that a producer, converter and distributor of repository information can be independently exchanged.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
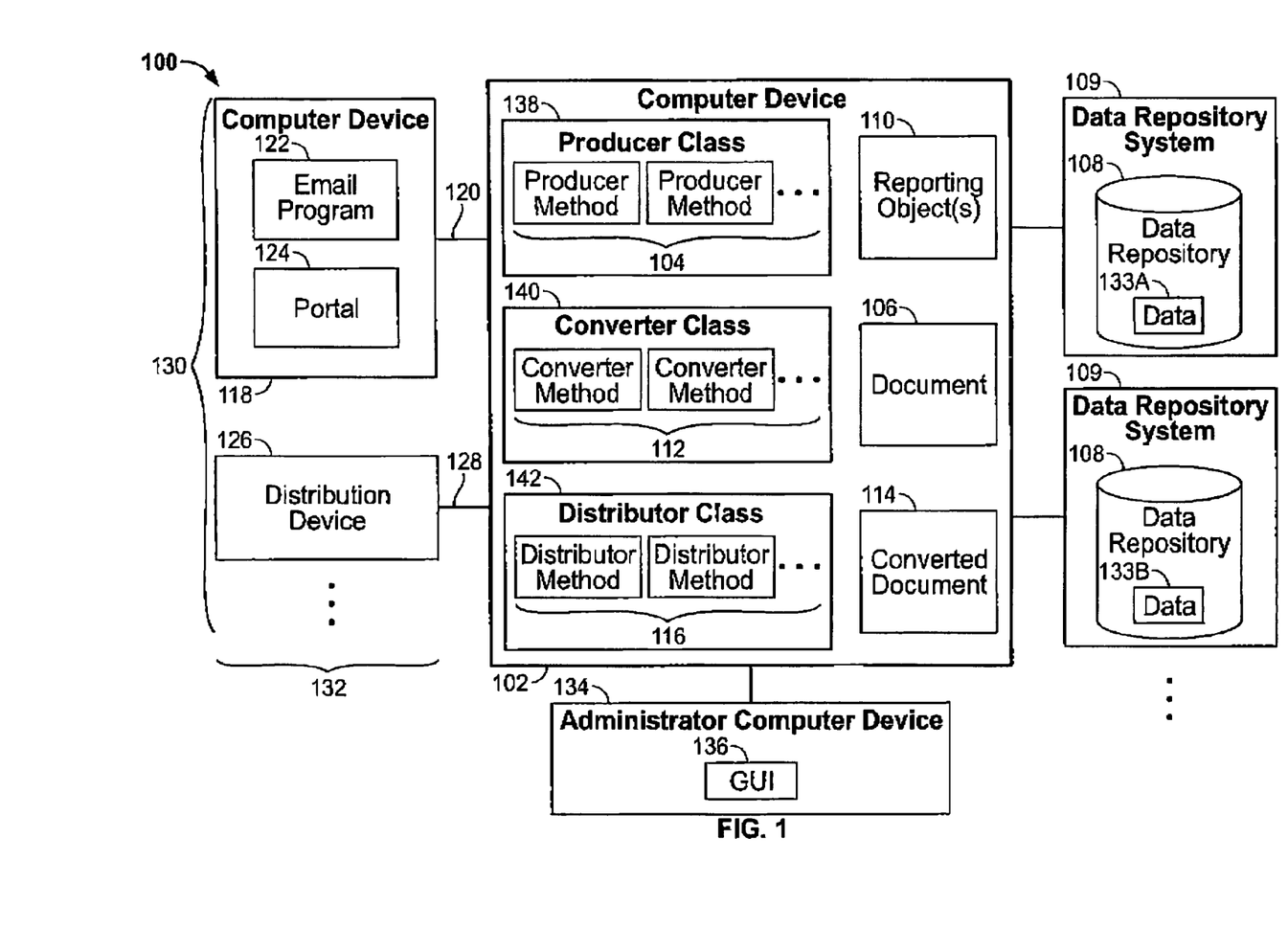
FIG. 1 is a block diagram of a computer system that distributes repository information.

FIG. 1 shows a computer system 100 that can distribute information retrieved from one or more repositories. The system includes a first computer device 102 that may operate as a central computer or server computer for the operations to be described in the following. The first computer device includes one or more producer methods 104. Each of the producer methods can be invoked to generate a document 106 using data retrieved from one or more data repositories 108. Each of the data repositories may be included in a separate data repository system 109.

The first computer device 102 may include one or more reporting objects 110 that can be used in retrieving the data, or generating the document, or both. For example, the reporting object may include a predefined query to be performed in the data repository. The reporting object can identify what type of document is to be generated with the producer method, such as a document that includes Hypertext Markup Language (HTML) code, or an Excel Workbook file. One or more of the reporting objects 110 may be used in generating the document 106.

The first computer device 102 includes one or more converter methods 112. Each of the converter methods can be invoked to convert the document 106 to a converted document 114 that has a predefined output format. For example, the converter method may convert an HTML document generated by the producer method to MHTML, a format that uses Multipurpose Internet Mail Extensions (MIME) and that allows HTML-coded content such as a web page to be embedded in an email message. As another example, the converter method may convert the document 106 to a zip file, an Extensible Markup Language (XML) file or into a file having the portable document format (pdf).

The first computer device 102 includes one or more distributor methods 116. Each of the distributor methods can be invoked to distribute the converted document 114 through a predefined distribution channel to one or more recipients. For example, the converted document 114 can be distributed as an email message sent to one or more specific users in the system 100. Such user(s) may access the system using a second computer device 118 that can communicate with the first computer device 102 through a connection 120, for example through any kind of network. Particularly, the email may be received and accessed using an email program 122 executed on the second computer device. As another example, the converted document 114 can be distributed to a portal 124 on the second computer device. For example, the converted document may comprise an item that can be displayed in the portal. While a single second computer device 118 is shown in this example, the system may include many connected computer devices in other implementations, for example so that documents produced by the producer method can be distributed to any or all of a large number of users.

As another example, the distributor method 116 may distribute the converted document 114 to a distribution device 126 that can communicate with the first computer device through a connection 128. For example, the distribution device may be a printer that prints the converted document on paper for delivery to the recipient, such as by placing the paper in an envelope addressed to the recipient. When the first computer device 102 is configured for handling fax transmissions, the distribution device may be a fax machine accessible to the recipient(s), wherein the fax machine receives a facsimile of the converted document. The distribution device may be a file server that provides access to the converted document in electronic format. As another example, the distribution device may be configured to provide information under the existing message standard Electronic Data Interchange (EDI). For example, the information may have a standardized format such as those defined by the ANSI X.12 standard or the EDI for Administration, Commerce and Transportation (EDIFACT) standard.

Thus, the converted document 114 may be distributed to one or more peripheral devices 130 where a user can access the document. The type of connection 120 or 128 may be different depending on the particular peripheral device. In each case, the particular mode of distribution involves using at least one distribution channel 132, which may comprise any of the peripheral devices and any of the connections 120 and 128. Other distribution channels may be used.

In this example, the first computer device is shown having a single document 106 stored therein. In some implementations, however, the one or more producer methods 104 may generate more than one document based on retrieving information such as first data 133A, and the several generated documents may be converted by the converter method and distributed by the distributor method in analogy with the above description. Other producer methods may retrieve other information—such as second data 133B—from the data repository for generating their respective document(s). The document appearance need not depend on the identity of the retrieved data: Another one of the producer methods 104 can generate a different document using the same retrieved first data 133A.

The invoking of the producer, converter and distributor methods may occur in different situations. For example, a user may trigger the invoking by making a specific input into the first computer device, for example using an administrator computer device 134 that can generate a GUI 136, as will be described below. As another example, the invoking may occur according to a schedule that the first computer device follows. For example, such a schedule may be associated with the particular producer, converter or distributor method that should be invoked. As another example, the invoking may be triggered by an event in the system 100, such as the loading of additional data into any of the data repositories 108.

Figure 2:
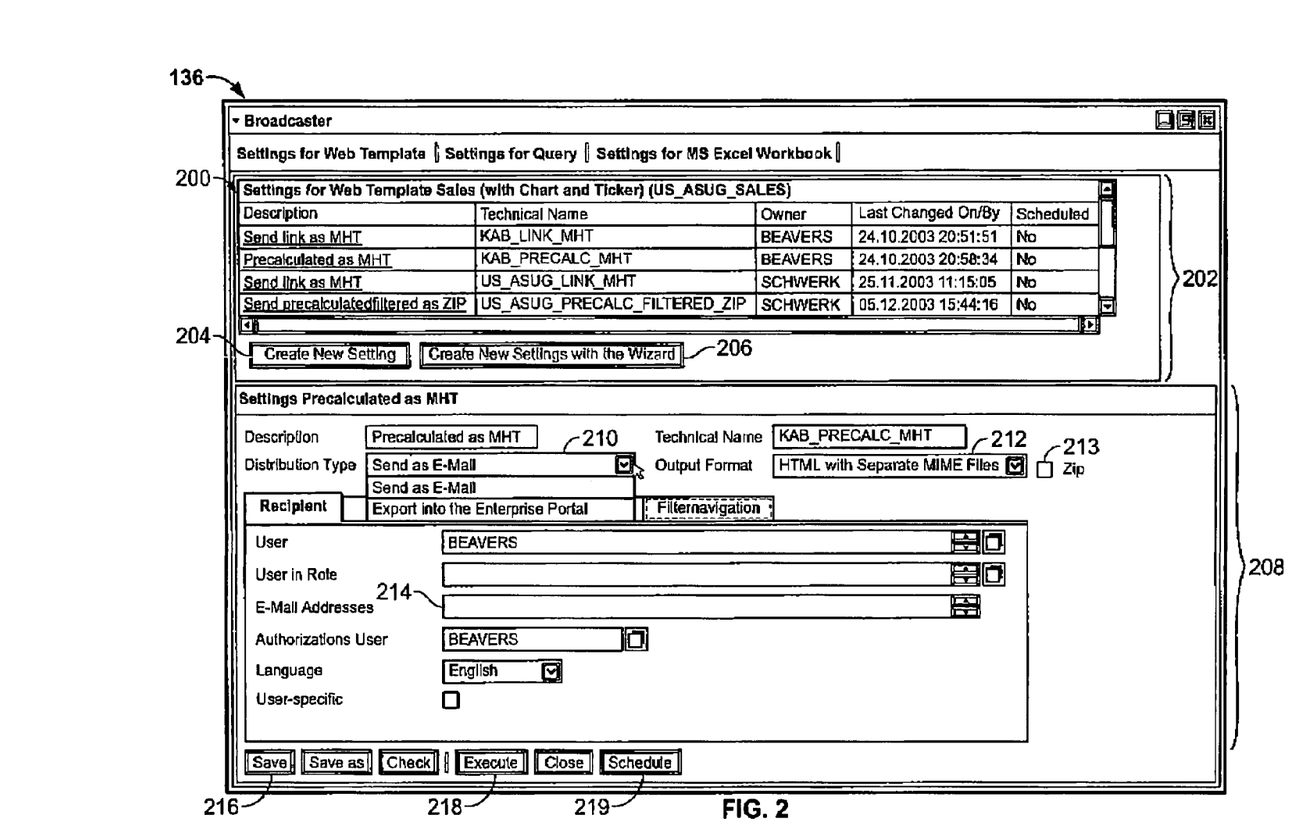
FIG. 2 is a GUI for administrating information distribution in the system shown in FIG. 1.

The GUI 136 lets a user configure the system 100, for example by selecting producer, converter and distributor methods to be used with particular data. FIG. 2 is an example of the GUI 136 that can be displayed upon the user selecting a particular one of the reporting objects 110 for the distribution. Here, a heading 200 reflects that the user has selected a reporting object that is of the type "web template", that the reporting object's technical name is US_ASUG_SALES, and that the reporting object is furthermore described as "Sales (with Chart and Ticker)".

A settings selection area 202 shows what setting(s), if any, the selected reporting object currently has associated with it. The existing settings in the area 202 include "Send link as MHT" and "Precalculated as MHT" among other settings. The user can open any existing setting by clicking it in the area 202. Alternatively, the user can initiate creation of a new setting using an input control 204, or initiate creation of a new setting with a wizard by selecting an input control 206. Here, the user clicks on the "Precalculated as MHT" setting, and some of its details are therefore displayed in a settings viewing area 208.

Each setting references its respective producer, converter and distributor methods. In this example where the GUI 136 is exclusively associated with the Sales reporting object, this reference determines the particular one of the producer methods 104 that is to be used. However, the GUI 136 lets the user make selections that determine the particular converter and distributor methods to be referenced by the setting. For example, the user can select a distribution type with a first input control 210 and an output format with a second input control 212.

The first input control 210 currently lists examples of two alternative distribution types: "Send as E-Mail" and "Export into the Enterprise Portal". Selecting the former will configure the setting so that the converted document 114 is distributed in a distribution channel for emails. For example, the setting may reference one of the distributor methods 116 that distributes the converted document 114 as an email over the connection 120 to the email program 122 on the second computer device 118. The user can specify one or more email addresses for this distribution type using an input field 214 in the settings viewing area 208. Another distribution type is obtained if the user instead selects the "Export into the Enterprise Portal" alternative in the first input control 210. This causes the setting to be configured so that the converted document 114 is distributed in a distribution channel for portal information. For example, the setting may reference one of the distributor methods 116 that distributes the converted document 114 as an item to be displayed in the portal 124 on the second computer device.

The second input control 212 currently lists an output format called "HTML with Separate MIME Files". This exemplary output-format selection causes the setting to be configured so that the document 106 generated by the producer method is converted to a format where the document contains HTML code and separate MIME files. Here, the selected output format determines the producer and converter methods. For example, the setting may reference one of the converter methods 112 that converts producer-generated documents into this specific format. The system can make other selections available in a drop-down list similar to the one used in the first input control. Alternatively, the GUI can let the user directly select the producer method from a list. Also, next to the second input control 212 is a third input control 213 that lets the user select a particular converter method. Here, the third input control lets the user choose to have the document converted into a zip file.

The user can save the setting as specified in the GUI 136 by clicking on a Save input control 216. The saved setting is then available for processing in the system 100. Moreover, the user can trigger processing of the setting by clicking on an Execute input control 218. That is, the user input made with the control 218 initiates document creation, conversion and distribution using the particular producer, converter and distributor methods referenced by the setting. A fourth input control 219 lets the user schedule processing of the setting, such as by specifying that the setting is to be processed upon new data being loaded into the data repository 108, or at regular intervals, or at a predefined time and date.

Figure 3:
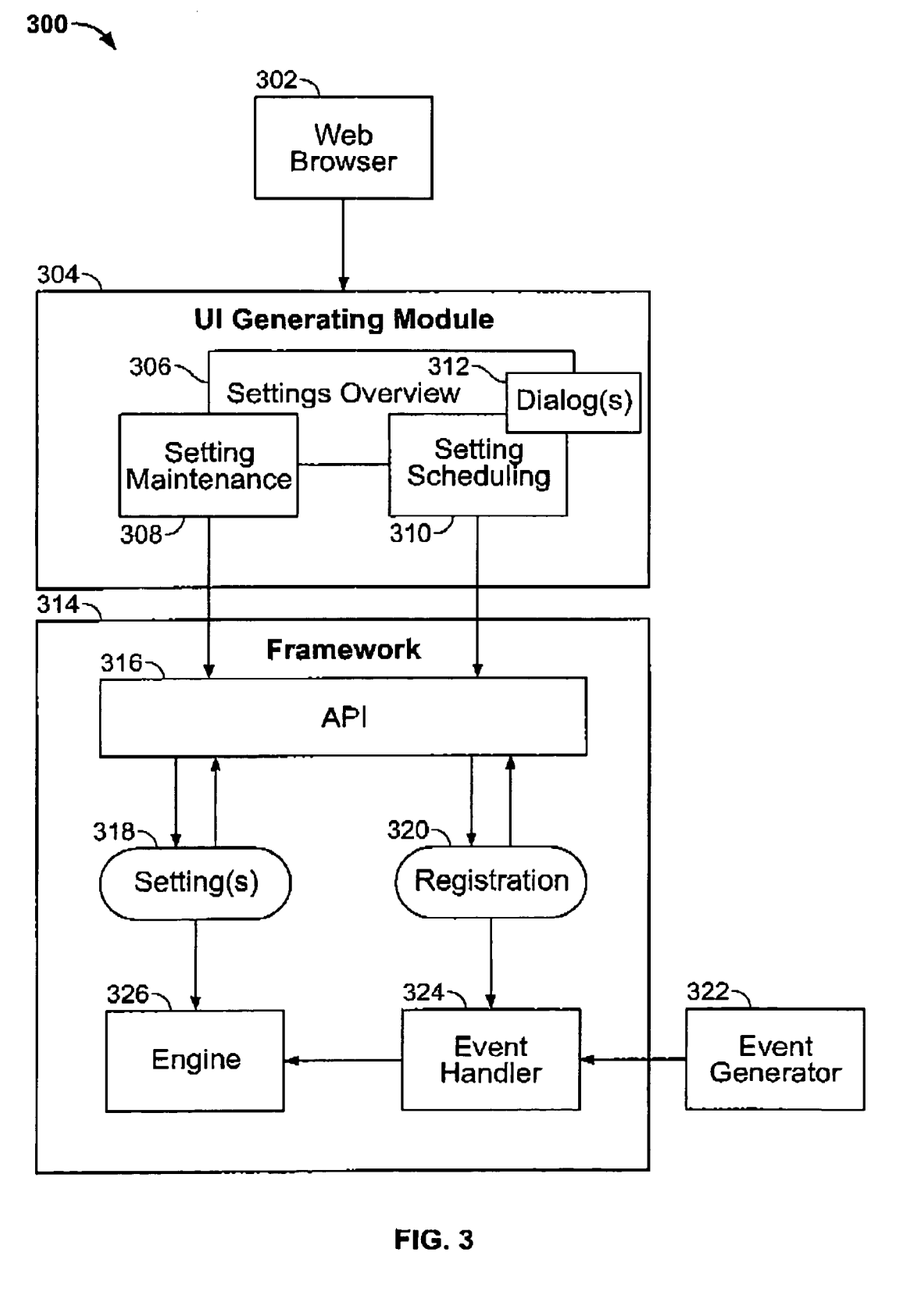
FIG. 3 is a diagram of an architecture that can be used in the system shown in FIG. 1.

FIG. 3 schematically shows an architecture 300 wherein a setting can be processed to retrieve, convert and distribute data using respective producer, converter and distributor methods. Here, the GUI 136 includes a web browser 302 being generated on the administrator computer device 134.

The architecture 300 includes a UI generating module 304 that produces the suitable screens (such as HTML screens) to be displayed in the GUI 136. The administrator may use the UI generating module for several purposes. First, it may provide the administrator an overview of the settings and their processing. This is schematically represented by a settings overview module 306 in the UI generating module. For example, the settings overview informs the user what settings have been defined in the architecture 300, or lets the user delete one or more settings.

Second, the UI generating module 304 may let the user maintain settings. This is schematically represented by a setting maintenance module 308. For example, the setting maintenance module can generate the GUI 136 as shown in FIG. 2 for display in the web browser 302.

Third, the UI generating module 304 may let the user schedule processing of settings. This is schematically represented by a settings scheduling module 310 in the UI generating module. For example, the setting scheduling module lets the user specify that the setting is to be processed at a certain time or times, or at regularly scheduled intervals. As another example, the settings scheduling module lets the user specify that the setting is to be processed upon the occurrence of one or more events.

The administrator's interaction with the UI generating module 304, such as with the respective settings overview, maintenance and scheduling modules, may be guided by one or more dialogs 312. For example, one of the dialogs 312 that is associated with the exemplary Sales reporting object can be generated by the GUI 136 as shown in FIG. 2.

The architecture 300 includes a framework 314 for processing one or more settings. The framework 314 may provide runtime and designtime environments for the setting(s). The designtime environment allows for creation of the producer, converter and distributor methods that are to be made available in the processing. The framework 314 includes an application program interface (API) 316 for the interactions with the UI generating module, such as with the setting maintenance and scheduling modules. The API 316 can be used also if the UI generating module 304 were replaced with a module for generating another type of UI.

The framework 314 includes one or more settings 318, wherein each setting references producer, converter and distributor methods to be invoked upon processing the setting. For example, the setting 318 can be created using the setting maintenance module 308. Moreover, the framework 314 includes at least one registration 320 that defines when particular ones of the settings 318 are to be processed. For example, the registration 320 can be created using the setting scheduling module 310 and may list one or more predefined events that should trigger processing of the setting. User-triggered processing of settings, for example using the Execute input control 218, does not require a registration.

The following is an example of operations that can be performed in the architecture 300. An event generator 322 generates an event. For example, the event may be a data change in one or more of the data repositories 108. The data change may occur upon a data loading process in which data is loaded into any of the data repositories, or upon data processing performed by any of the data repository systems 109. In some implementations, the event generator 322 generates the event only if the data change meets a predefined criterion. Alternatively, the event may be generated for every data change, whether important or trivial, and later processing of the generated event can determine whether the event should trigger processing of a setting.

The event generator informs an event handler 324 in the framework 314 about the generated event. The event handler, in turn, accesses the registration 320 to determine whether any of the settings 318 should be processed upon the generation of this event. The registration may include a list that associates settings with the respective event(s) for which they should be processed. Accordingly, the registration 320 may identify one or more settings for the event handler. In some implementations, the registration can include conditions for processing any given setting, such as a condition that the setting is to be processed only if the data change to which the event relates meets a predefined criterion.

The event handler may trigger an engine 326 to process the setting(s) identified by the registration 320. The engine 326 initiates that processing, which involves invoking the producer, converter and distributor methods referenced by the setting. When the data retrieval is to be performed using the reporting object 110, the setting 318 may include an attribute that identifies the reporting object. The producer method 104, upon being invoked, can obtain the reporting-object attribute from the setting and use it in retrieving the repository data. The producer method generates the document 106 by retrieving data from one or more of the data repositories 108. The converter method, in turn, converts the document 106 to the specified output format. The distributor method then distributes the converted document 106 in one or more of the distribution channels 132.

The framework 314 permits flexible changing of the producer, converter or distributor methods. Particularly, the framework may be configured to permit addition of at least one additional producer, converter or distributor method without modifying the existing producer, converter and distributor methods. This lets users of the architecture 300 flexibly configure the data retrieval and distribution, because the addition of a new distributor method, for example, need not affect the existing producer and converter methods. Moreover, the newly added distributor method can be added to a setting that already refers to respective producer and converter methods.

Flexible extension of any method may be done as follows. If a producer method is being added, the user can declare the converter and distributor methods that should be available for use with the new producer method. This may involve selecting an output format and a distribution type, in analogy to the description of FIG. 2 above. The user may declare one or more attributes required by the new producer method. For example, the new producer method may accept input of an object type and object identifier of the reporting object, as well as attribute values maintained in the setting. Moreover, the new producer method may be defined to produce the generated document as output, optionally with authorization information or document attributes.

For a new converter method, the user may define its output format in the framework 314. In some implementations, the converter methods are not configured to have attributes. The user may then implement the method according to the converter-class definition. For example, the converter method is configured to accept a document and a target format as inputs and to produce the converted document as output.

For a new distributor method, the user may define its distribution type and specify with which output format(s) the new distributor method is to be used. The user may declare one or more attributes required by the new distributor method. For example, the new distributor method can receive the converted document and distribution type as input.

In some implementations, the producer, converter and distributor methods are members of respective classes. Referring again to FIG. 1, the producer methods 104 may be associated with a producer class 138, the converter methods 112 with a converter class 140, and the distributor methods 116 with a distributor class 142. Accordingly, the classes 138-142 defines the respective methods that can be included as their members. There may be a 1-to-1 relationship between the producer class and the producer method, in which situation exchanging a producer method may be conveniently done by introducing another producer class.

For addition of any type of method, the user can define in the framework 314 any constraints that should affect the use of the newly added method.

Figure 4:
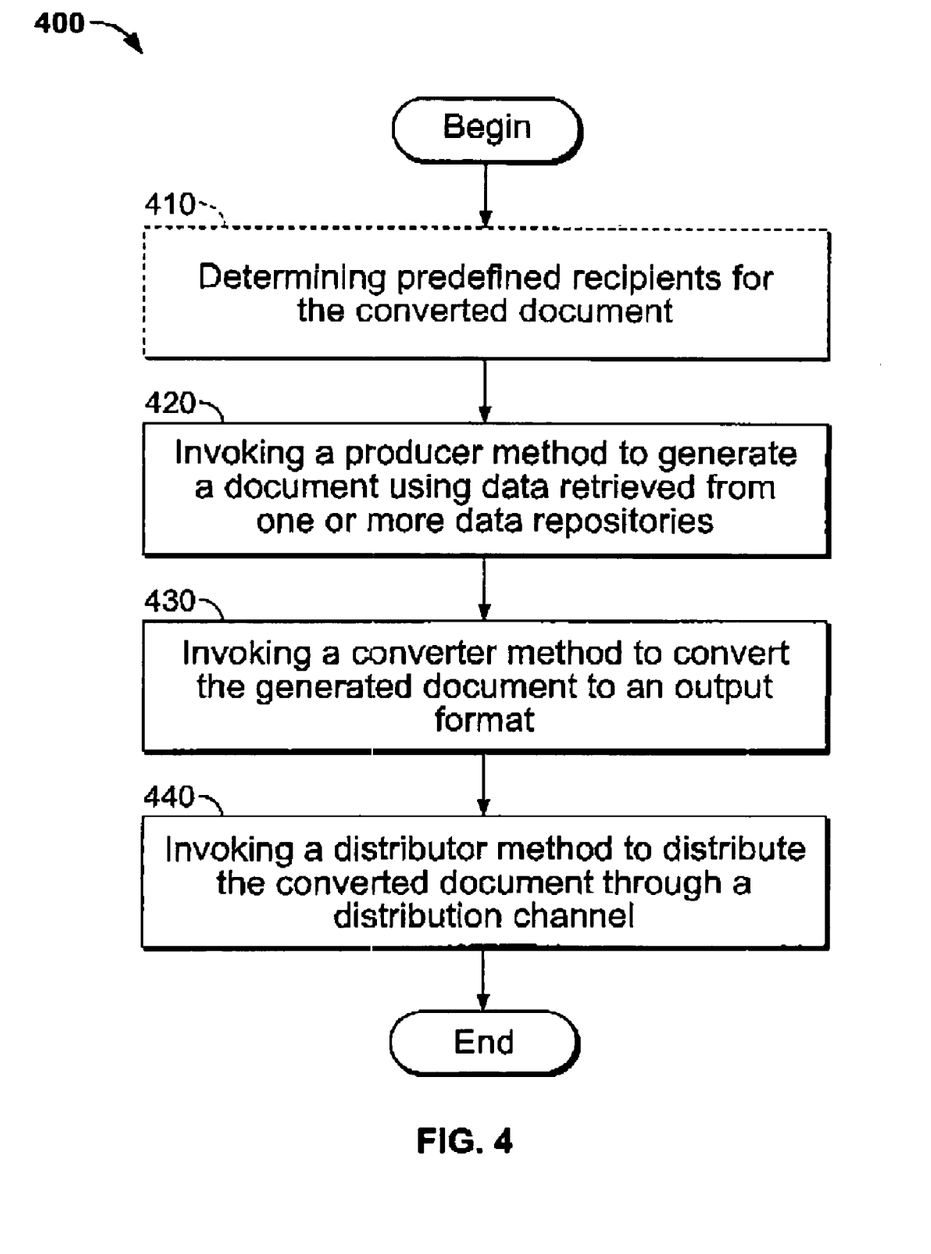
FIG. 4 is an embodiment of an inventive method.

FIG. 4 is a flow chart of a method 400 according to one embodiment of the invention. For example, a computer program product can include instructions that cause a processor to perform the steps of the method 400. The method includes the following steps:

Determining, in optional step 410, predefined recipients for the converted document. For example, the document to be converted may be intended for distribution as an email to the predefined recipients, and the predefined recipients' email addresses may be listed in the input field 214 in the GUI 136. If the optional step 410 is performed, the predefined recipients may be determined by reading their respective email addresses in the input field 214.

Invoking, in step 420, a producer method to generate a document using data retrieved from one or more data repositories. For example, the first computer device 102 may invoke the producer method 104 to retrieve the data 133A or 133B from the data repositories 108. The producer method may generate the document 106, such as an HTML document.

Invoking, in step 430, a converter method to convert the generated document to an output format. For example, the first computer device can invoke the converter method 112 to convert the document 106 to the converted document 114. The converted document has a specific output format, such as "HTML with Separate MIME files" as was described above.

Invoking, in step 440, a distributor method to distribute the converted document through a distribution channel. For example, the first computer device may invoke the distributor method 116 to distribute the converted document through any or all of the distribution channels 132. For example, a distribution channel may involve distributing the converted document as an email or sending the converted document to a printer, fax or file server.

The optional step 410 may be invoked before invoking any of the steps 420-440 in the method 400. Moreover, the steps 420-440 may be separately invoked for each of the predefined recipients that were determined in step 410. The separate invoking may involve processing a loop over the determined predefined recipients, for example such that the steps 420-440 are performed for a first recipient, thereafter the steps 420-440 are performed for a second recipient, and so on. Recipient-specific parameters can be taken into account for each recipient. For example, step 420 may also include filtering document contents so that a cost center report can be sent to corresponding cost centers.

Figure 5:
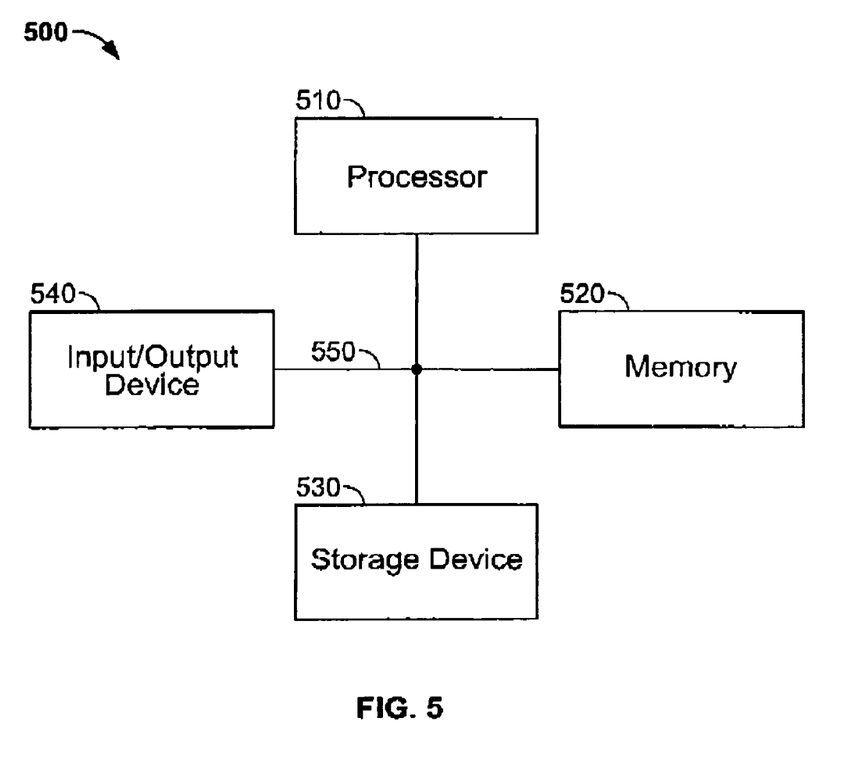
FIG. 5 is a block diagram of a general computer system.

FIG. 5 is a block diagram of a general computer system 500 that can be used in the operations described above, according to one embodiment. The system 500 includes a processor 510, a memory 520, a storage device 530 and an input/output device 540. Each of the components 510, 520, 530 and 540 are interconnected using a system bus 550. For example, any or all of the first and second computer devices, the administrator computer device, and data repository system(s) described with reference to FIG. 1 can include the system 500.

The processor 510 is capable of processing instructions for execution within the system 500. In one embodiment, the processor 510 is a single-threaded processor. In another embodiment, the processor 510 is a multi-threaded processor. The processor 510 is capable of processing instructions stored in the memory 520 or on the storage device 530, including for receiving or sending information through the input/output device 540.

The memory 520 stores information within the system 500. In one embodiment, the memory 520 is a computer-readable medium. In one embodiment, the memory 520 is a volatile memory unit. In another embodiment, the memory 520 is a non-volatile memory unit.

The storage device 530 is capable of providing mass storage for the system 500. In one embodiment, the storage device 530 is a computer-readable medium. In various different embodiments, the storage device 530 may be a floppy disk device, a hard disk device, an optical disk device, or a tape device.

The input/output device 540 provides input/output operations for the system 500. In one embodiment, the input/output device 540 includes a keyboard and/or pointing device. In one embodiment, the input/output device 540 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of distributing information retrieved from one or more data repositories, the method comprising:
    invoking, at a computer device separate from the one or more data repositories, a producer method to generate a document using data retrieved from one or more data repositories, the producer method selected, at a user interface, from a plurality of producer methods, wherein the plurality of producer methods are configured to generate different documents based on same data retrieved from the one or more data repositories;
    invoking, at the computer device separate from the one or more data repositories, a converter method to convert the generated document to an output format, the converter method selected, at the user interface, from a plurality of converter methods; and
    invoking, at the computer device separate from the one or more data repositories, a distributor method to distribute the converted document through a distribution channel, the distributor method selected, at the user interface, from a plurality of distributor methods, wherein the invoking of the producer, converter, and distributor methods is triggered by an event, and wherein the producer, converter, and distributor methods are registered to be selected when the trigger is received;
    wherein the event is associated, at the user interface, with one or more settings defining the producer, converter, and distributor methods and at least one of the producer, converter, and distributor methods can be added to the one or more settings without affecting existing at least one of producer, converter, and distributor methods defined by the one or more settings, wherein the at least one of the added producer, converter, and distributor methods is configured to operate with the at least one of the invoked producer, converter, and distributor methods;
    wherein the one or more settings is processed based upon a condition that the event meets a predefined criterion.

2. The method of claim 1, wherein the data is retrieved from the one or more data repositories using a reporting object, wherein the user interface includes a page from which the producer method is selected from the plurality of producer methods, the converted method is selected from the plurality of converter methods, and the distributor method is selected from the plurality of distributor methods.

3. The method of claim 2, wherein the document generated with the producer method is defined by the reporting object.

4. The method of claim 2, wherein another producer method can generate a different document using the data retrieved using the reporting object.

5. The method of claim 2, wherein the data is retrieved using more than one reporting object.

6. The method of claim 1, wherein the producer, converter and distributor methods are invoked by processing a setting that references the producer, converter and distributor methods.

7. The method of claim 6, wherein the setting is processed in a framework that provides runtime and design time environments for the setting.

8. The method of claim 7, wherein the framework includes at least one selected from the group consisting of:
    several producer methods associated with a producer class;
    several converter methods associated with a converter class; and
    several distributor methods associated with a distributor class.

9. The method of claim 7, wherein the framework is configured to permit addition of at least one additional producer, converter or distributor method without modifying the existing producer, converter and distributor methods.

10. The method of claim 6, wherein the setting references a reporting object for retrieving the data from the one or more data repositories.

11. The method of claim 1, wherein the document generated with the producer method is an HTML document.

12. A computer-implemented method of distributing information retrieved from one or more data repositories, the method comprising:
    invoking, at a computer device separate from the one or more data repositories, a producer method to generate a document using data retrieved from one or more data repositories, the producer method selected, at a user interface, from a plurality of producer methods, wherein the plurality of producer methods are configured to generate different documents based on same data retrieved from the one or more data repositories;
    invoking, at the computer device separate from the one or more data repositories, a converter method to convert the generated document to an output format, the converter method selected, at the user interface, from a plurality of converter methods; and invoking, at the computer device separate from the one or more data repositories, a distributor method to distribute the converted document through a distribution channel, the distributor method selected, at the user interface, from a plurality of distributor methods;

wherein the invoking of the producer, converter, and distributor methods is triggered by at least one of the following: a schedule, a user input, and an event, and wherein the producer, converter, and distributor methods are registered to be selected when the trigger is received;

wherein the schedule, the user input, or the event is associated, at the user interface, with one or more settings defining the producer, converter, and distributor methods and at least one of the producer, converter, and distributor methods can be added to the one or more settings without affecting existing at least one of producer, converter, and distributor methods defined by the one or more settings, wherein the at least one of the added producer, converter, and distributor methods is configured to operate with the at least one of the invoked producer, converter, and distributor methods;

wherein the one or more settings is processed based upon a condition that the schedule, the user input, or the event meets a predefined criterion.

13. The method of claim 12, wherein the invoking is triggered by the user input, and wherein the user input is made upon a user creating a setting that references the producer, converter and distributor methods.

14. The method of claim 12, wherein the invoking is triggered by the event, and wherein the event is a data change in at least one of the one or more data repositories.

15. The method of claim 14, wherein the invoking is tied to a data loading process.

16. The method of claim 14, wherein the invoking is conditioned upon the data change meeting a predefined criterion.

17. The method of claim 12, wherein a user triggers the invoking of the producer, converter and distributor methods upon selecting the output format and a distribution type for the data, and wherein the producer, converter and distributor methods are selected based on the selected output type and the selected distribution type.

18. The method of claim 17, wherein the user selects the output format and the distribution type after specifying a reporting object to be used in retrieving the data from the one or more repositories.

19. The method of claim 12, wherein the producer method generates several documents using the data, wherein the converter method converts the several documents, and wherein the distributor method distributes the several converted documents.

20. The method of claim 12, wherein the converted document distributed through the distribution channel is at least one selected from the group consisting of: an electronic message, an item for display in a portal, and combinations thereof.

21. The method of claim 12, further comprising determining predefined recipients for the converted document, the predefined recipients being determined before invoking the producer method.

22. The method of claim 21, wherein after the predefined recipients are determined, the producer, converter and distributor methods are separately invoked for each of the predefined recipients.

23. The method of claim 22, wherein separately invoking the producer, converter and distributor methods involves processing a loop over the predefined recipients, wherein recipient-specific parameters can be taken into account for each of the predefined recipients.

24. A computer-readable medium containing executable instructions that when executed cause a processor to perform operations comprising:

invoking, at a computer device separate from the one or more data repositories, a producer method to generate a document using data retrieved from one or more data repositories, the producer method selected, at a user interface, from a plurality of producer methods, wherein the plurality of producer methods are configured to generate different documents based on same data retrieved from the one or more data repositories;

invoking, at the computer device separate from the one or more data repositories, a converter method to convert the generated document to an output format, the converter method selected, at the user interface, from a plurality of converter methods; and invoking, at the computer device separate from the one or more data repositories, a distributor method to distribute the converted document through a distribution channel, the distributor method selected, at the user interface, from a plurality of distributor methods, wherein the invoking of the producer, converter, and distributor methods is triggered by an event, and wherein the producer, converter, and distributor methods are registered to be selected when the trigger is received;

wherein the event is associated, at the user interface, with one or more settings defining the producer, converter, and distributor methods and at least one of the producer, converter, and distributor methods can be added to the one or more settings without affecting existing at least one of producer, converter, and distributor methods defined by the one or more settings, wherein the at least one of the added producer, converter, and distributor methods is configured to operate with the at least one of the invoked producer, converter, and distributor methods;

wherein the one or more settings is processed based upon a condition that the event meets a predefined criterion.

25. A software framework for distributing information retrieved from one or more data repositories, the software framework stored on a computer-readable medium, the software framework comprising:

a processor; and a memory configured to provide a process comprising:

invoking, at a computer device separate from the one or more data repositories, a producer method to generate a document using data retrieved from one or more data repositories, the producer method selected, at a user interface, from a plurality of producer methods, wherein the plurality of producer methods are configured to generate different documents based on same data retrieved from the one or more data repositories;

invoking, at the computer device separate from the one or more data repositories, a converter method to convert the generated document to an output format, the converter method selected, at the user interface, from a plurality of converter methods; and invoking, at the computer device separate from the one or more data repositories, a distributor method to distribute the converted document through a distribution channel, the distributor method selected, at the user interface, from a plurality of distributor methods, wherein the invoking of the producer, converter, and distributor methods is triggered by an event, and wherein the producer, converter, and distributor methods are registered to be selected when the trigger is received;

wherein the event is associated, at the user interface, with one or more settings defining the producer, converter, and distributor methods and at least one of the producer, converter, and distributor methods can be added to the one or more settings without affecting existing at least one of producer, converter, and distributor methods defined by the one or more settings, wherein the at least one of the added producer, converter, and distributor methods is configured to operate with the at least one of the invoked producer, converter, and distributor methods;

wherein the one or more settings is processed based upon a condition that the event meets a predefined criterion.

26. The software framework of claim 25, wherein the software framework is configured to allow addition of at least one new method selected from the group consisting of:

a new producer method;

a new converter method; and a new distributor method.

27. The software framework of claim 26, wherein the addition of the at least one new method involves declaring an attribute for the at least one new method.

28. The software framework of claim 26, wherein the new converter method is added and wherein the addition of the new converter method involves declaring a new output format.

29. The software framework of claim 26, wherein the new distributor method is added and wherein the addition of the new distributor method involves declaring a new distribution type.

30. The software framework of claim 26, wherein the software framework is configured to permit the addition of the at least one new method without modifying the existing producer, converter and distributor methods.

31. The software framework of claim 25, further comprising a setting that references the producer, converter and distributor methods, wherein the producer, converter and distributor methods can be invoked by processing the setting.

32. The software framework of claim 31, wherein the data is to be retrieved from the one or more data repositories using a reporting object, and wherein the setting includes an object type for the reporting object and an object identifier for the reporting object.

* * * * *